(12) United States Patent
Chen et al.

(10) Patent No.: US 10,913,149 B2
(45) Date of Patent: Feb. 9, 2021

(54) ANTI-STICKING ROTATING DEVICE AND A SMART PET ROBOT

(71) Applicant: Dogness Group LLC, Plano, TX (US)

(72) Inventors: Silong Chen, Dongguan (CN); Yunhao Chen, Plano, TX (US)

(*) Notice: Subject to any disclaimer, the term of this patent is extended or adjusted under 35 U.S.C. 154(b) by 250 days.

(21) Appl. No.: 16/147,601

(22) Filed: Sep. 29, 2018

(65) Prior Publication Data

US 2020/0101594 A1  Apr. 2, 2020

(51) Int. Cl.
| | |
|---|---|
| B25J 9/10 | (2006.01) |
| A01K 5/01 | (2006.01) |
| A01K 15/02 | (2006.01) |
| F16H 55/26 | (2006.01) |
| B25J 19/04 | (2006.01) |
| F16H 1/06 | (2006.01) |
| F16H 55/17 | (2006.01) |
| B25J 9/00 | (2006.01) |

(52) U.S. Cl.
CPC ............. *B25J 9/102* (2013.01); *A01K 5/0114* (2013.01); *A01K 15/025* (2013.01); *B25J 9/0003* (2013.01); *B25J 19/04* (2013.01); *F16H 1/06* (2013.01); *F16H 55/17* (2013.01); *F16H 55/26* (2013.01)

(58) Field of Classification Search
CPC .......... B25J 9/102; B25J 9/0003; B25J 19/04; A01K 5/0114; A01K 15/025; F16H 1/06; F16H 55/17; F16H 55/26
USPC ...................................... 74/29, 41
See application file for complete search history.

(56) References Cited

U.S. PATENT DOCUMENTS

| | | | |
|---|---|---|---|
| 496,000 A * | 4/1893 | Reiss .................... | F16H 19/025 74/25 |
| 2,500,243 A * | 3/1950 | Dixon .................. | A01K 5/0291 119/51.13 |
| 4,671,210 A * | 6/1987 | Robinson ............. | A01K 5/0291 119/51.12 |
| 8,800,488 B2 * | 8/2014 | Stone .................... | A01K 5/0291 119/51.01 |
| 9,936,680 B2 * | 4/2018 | Womble ................. | A01K 15/02 |
| 2017/0238503 A1 * | 8/2017 | Deritis ................. | A01K 5/0275 |
| 2020/0093092 A1 * | 3/2020 | Soug ..................... | B25J 9/1669 |

FOREIGN PATENT DOCUMENTS

WO  WO-2017157302 A1 *  9/2017  ............. B25J 11/00

* cited by examiner

*Primary Examiner* — Thomas C Diaz
(74) *Attorney, Agent, or Firm* — ZANIP

(57) ABSTRACT

An anti-sticking rotating device is arranged below a head and comprises a base and a runner; the base is provided with a slot, and two flanges are arranged on both sides of the top surface of the slot; the runner is in the shape of a disc, the center of it is provided with a rotary shaft, the two ends of the rotary shaft are pivoted with the flange, and the runner is placed in the slot; an extending part is arranged on the circumference of the runner, and the extending part is fixed to the head; the two sides of the runner are respectively provided with a driving mechanism and a limiting mechanism; the driving mechanism drives the runner to rotate, and the limiting mechanism limits its direction and amplitude of rotation, thereby driving the head to move like nodding.

8 Claims, 9 Drawing Sheets

ANTI-STICKING ROTATING DEVICE AND A SMART PET ROBOT

FIELD OF THE INVENTION

The present invention relates to a robot technical field, in particular relates to an anti-sticking rotating device and a smart pet robot.

BACKGROUND OF THE INVENTION

With the continuous improvement of people's living standards, many families feed pets. But when the owners need to go out, pets are left unfed. For this reason, many people put food in a bowl before going out and let the pets eat for themselves. But the consequences may be that pets eat and drink too much without regular, it easily causes pets indigestion and is not conductive to the health of pets, thereby causing unnecessary trouble to the owners. Now the digital technology is very developed, if the network is combined with pet feeding, the owners can control the pet feeding remotely, which can easily solve the problem of pet feeding when people go out. However, the current pet feeding robot is prone to the phenomenon of jam, which can be solved by shaking the pet robot, but sometimes people can not handle it in the distance, resulting in that the pet has no food to eat.

BRIEF SUMMARY OF THE INVENTION

In order to overcome the shortcomings of the prior art, the first object of the present invention is to provide an anti-sticking rotating device to resolve the problem of jam. The second object of the present invention is to provide a smart pet robot with the anti-sticking rotating device, the anti-sticking rotating device can cause pet grain to flow out smoothly. The third object of the present invention is to provide a control system of the smart pet robot, which can control the smart pet robot to move in all directions to take photos and videos and store in the device. People also can interact with pets through laser pen. The head of the smart pet robot is also equipped with multiple food boxes, and one charge for the smart pet robot can be used for a long time.

The technical proposals of the present invention are as follows:

An anti-sticking rotating device comprises:

a base, the base is provided with a mounting slot, and two flanges are arranged on both sides of the top surface of the mounting slot;

a runner, the runner is in the shape of a disc, the center of it is provided with a rotary shaft, the two ends of the rotary shaft are pivoted with the flange, and the runner is placed in the mounting slot;

An extending part is arranged on the circumference of the runner, and the extending part is fixed to a head; the two sides of the runner are respectively provided with a driving mechanism and a limiting mechanism; the driving mechanism drives the runner to rotate, and the limiting mechanism limits its direction and amplitude of rotation, thereby driving the head to move like nodding.

The driving mechanism has a first motor, the first motor is fixed with a reducer, the shaft of the reducer is fixed with a gear, the gear meshes with a rack, and the rack is fan-shaped and arranged on one side of the runner.

The limiting mechanism comprises two micro switches and an extending block; the two micro switches are arranged on the other side of the runner; the two flanges are fixed with a first retaining ring and a second retaining ring respectively to form two through holes; the two ends of the rotary shaft are respectively pivoted with the two through holes; the second retaining ring is provided with the extending block which is inserted between the two micro switches; the runner rotates and the two micro switches rotate simultaneously and touches the extending block to rotate reversely.

A smart pet robot with the anti-sticking rotating device has a housing, which comprises the head and the body; the head is provided with a feeding device and a camera device in it. The body is provided with the anti-sticking rotating device, a steering device and a laser emitting device.

The head includes an upper plate, a flip cover which is set at the top of the upper plate, and a lower plate fixed to the bottom thereof. The top of the upper plate is provided with a containing groove, the bottom of which is provided with a through hole; the feeding device includes a turntable, a second motor, a small gear, a photoelectric switch and a channel; the turntable is arranged in the containing groove, the turntable is evenly separated into a plurality of slots, and the through hole is arranged below the slot; the flip cover covers the turntable on the containing groove; the second motor is placed between the upper plate and the lower plate; the small gear is fixed to the middle of the shaft of the second motor; the end part of the shaft of the second motor is fixed to the turntable; the photoelectric switch is arranged at the bottom of the containing groove; the number of teeth of the small gear corresponds to the number of slots in the turntable, and when each tooth of the small gear turns around the photoelectric switch, it is detected by the photoelectric switch; the containing groove connects with one end of the channel through the through hole, the other end of the channel is fixed to the lower plate, and the lower plate is provided with an opening opposite to the other end of the channel.

The camera device is arranged in front and back of the feeding device and is fixed to the upper plate; the camera device comprises a front camera, two button switches and a rear camera; the front camera is arranged in the middle of the two switch buttons and is fixed to the front of the upper plate, and the rear camera is fixed to the back of the upper plate.

The body comprises an upper housing body, a closing plate, a laser transmission plate, a avoiding shell and a lower shell body; the closing plate is arranged in the middle of the bottom of the lower shell body; the top of the upper shell body is provided with a notch, the avoiding shell is mounted on the notch, and the avoiding shell is provided with an opening for the runner, the runner extends from the opening and the extending part is fixed with the lower plate of the head.

The steering device is provided with a third motor and a fourth motor; the rotating shaft of the third motor and that of the fourth motor are respectively fixed to the left wheel and the right wheel; the steering device is arranged on both sides of the anti-sticking rotating device and is fixed to the lower shell body f the body, and the center shaft of the two wheels is arranged parallel to that of the rotary shaft; the third motor and the fourth motor are fixed to the lower housing body through two fixed hoops; the rear plate of the lower shell body is fixed with a wheel mounting plate, the wheel mounting plate is fixed with a wheel, and the wheel is distributed in an isosceles triangle with the left wheel and the right wheel.

The laser emitter is positioned in front of the anti-sticking rotating device and located behind the laser transmission plate of the body; the laser emitter is provided with three laser pens and an installation frame; the number of the laser pens is at least two, the laser pens are fixed to the mounting frame, which is fixed to the lower shell body of the body and is located in front of the base.

The control device includes a charging socket, a battery, a first circuit board, a second circuit board and a third circuit board; the charging socket is arranged on the back plate of the lower shell body; the third circuit board is arranged under the anti-sticking rotating device and is fixed to the base, and the battery is arranged in the base and under the third circuit board; the first circuit board and the second circuit board are arranged on both sides of the first motor and below the turntable.

The control system of the smart pet robot includes a wireless network transmission module, a central control unit, the anti-sticking rotating device, the feeding device, the steering device, the laser pen and the camera device and an APP installed on the smart phone; the wireless network transmission module, the feeding device, the steering device, the camera device and the laser pen are electrical and signal connections to the central control unit, respectively;

The wireless network transmission module is used for receiving remote control instructions from the smart phone;

The central control unit is used for sending corresponding orders to control the anti-sticking rotating device, the feeding device, the steering device, the laser pen and the camera device according to the remote control instructions received by the wireless network transmission module;

The feeding device is used for throwing food to a pet according to the corresponding order sent by the central control unit.

The anti-sticking rotating device rotates to shake the stuck food and drop it down according to the corresponding instructions sent by the central control unit.

The steering device is used for moving the smart pet robot in according to the corresponding instructions sent by the central control unit and throw the food in front of the pet.

The laser pen is used for firing a laser to attract the attention and interest of a pet according to a corresponding instructions sent by the central control unit so that the pet can run with the laser.

The camera device is used for real-time shooting the video of the pet running along with the smart pet robot in motion, according to the corresponding instructions sent by the central control unit, and transmitting the video to the smart phone.

The present invention has the following beneficial effects: the present invention is provided with an anti-sticking rotating device to resolve the problem of jam. The smart pet robot with the anti-sticking rotating device can cause grain to flow out smoothly. The control system of the smart pet robot can control the smart pet robot to move in all directions to take photos and videos and store in the device. People also can interact with pet through laser pen. The head of the smart pet robot is also equipped with multiple food boxes, one charge for the smart pet robot can be used for a long time.

DETAILED DESCRIPTION OF THE INVENTION

Figure 1:
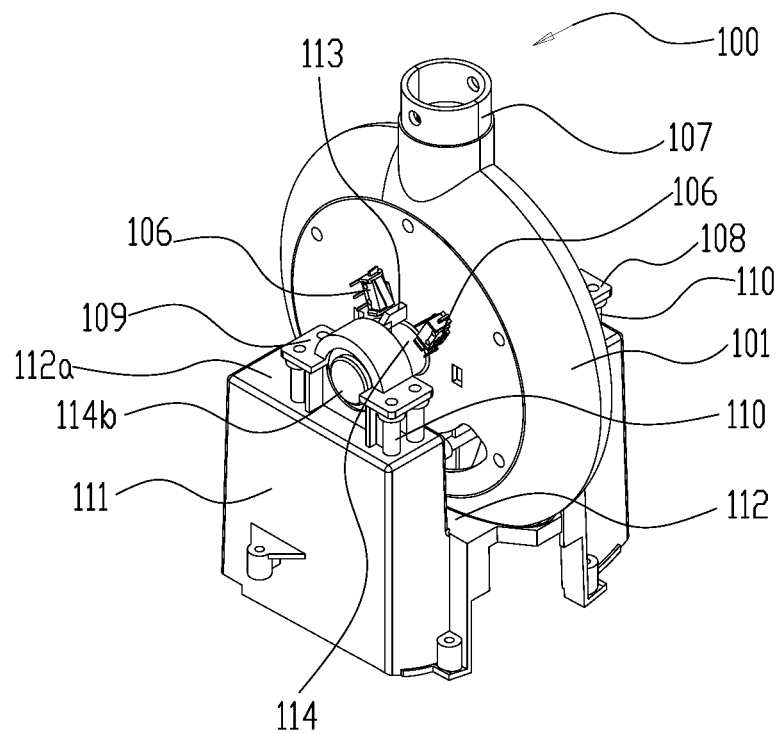
FIG. 1 is a stereoscopic diagram of the anti-sticking rotating device in the present invention.

In order to make aim of the present invention more clear, the technical scheme and the technical effect are clearer. The present invention is further explained in combination with the specific embodiment. It should be understood that the specific embodiments described herein are used only to explain the present invention and not to define the present invention.

What needs to be explained is that in the present invention, the terms "center", "upper", "lower", "left", "right", "vertical", "level", "inside" and "outside" etc., are used to describe the azimuth or position relationship based on those shown in the drawings and it is intended only to facilitate the description of the present invention and to simplify the description, and it is not to indicate or imply that the device or component to which it refers must have a particular orientation, construction and operation with a specific orientation, therefore it can not be understood as a limit on the present invention. In addition, the terms "first", "second" and "third" are used only for descriptive purposes and cannot be understood as indicative or implied relative Importance.

Figure 2:
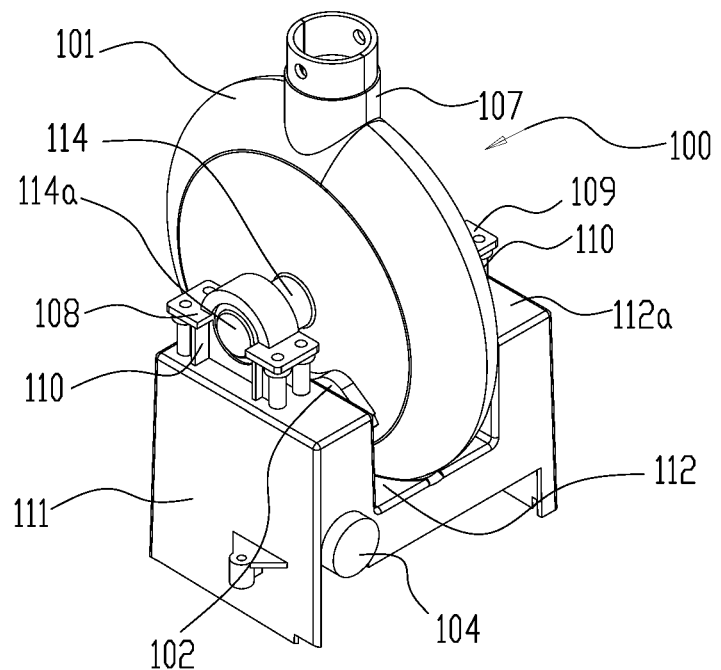
FIG. 2 is the other stereoscopic diagram of the anti-sticking rotating device in the present invention.
Figure 3:
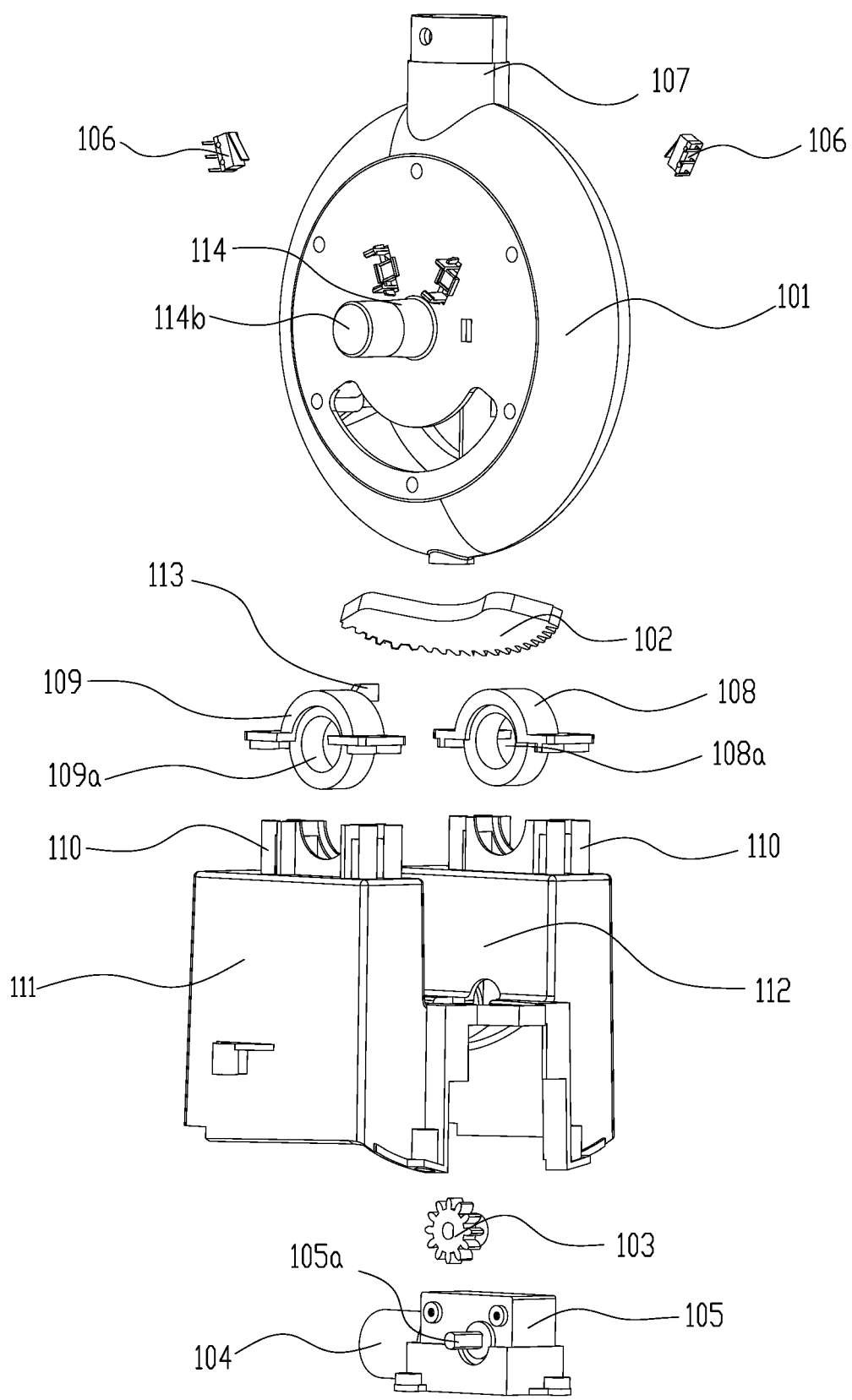
FIG. 3 is an explosion diagram of the anti-sticking rotating device shown in FIG. 1.
Figure 4:
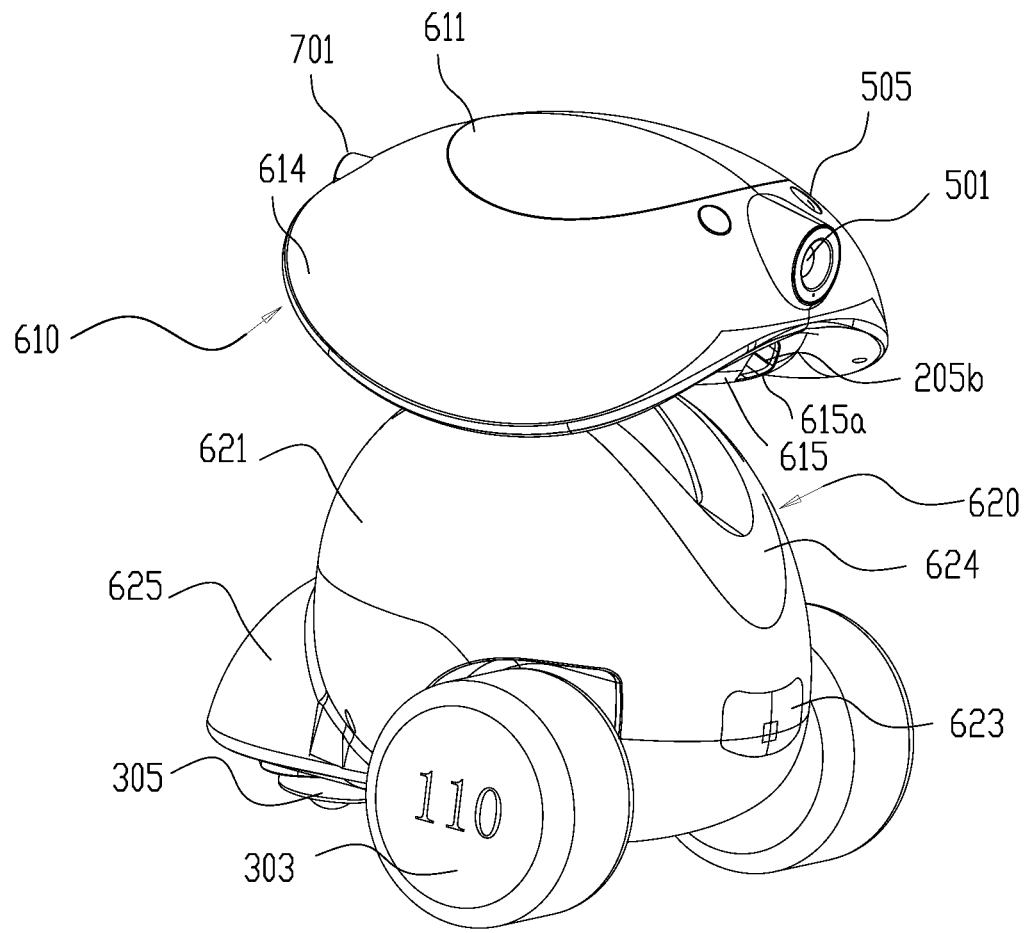
FIG. 4 is a stereoscopic diagram of the smart pet robot of the present invention.

Referring to FIG. 1, FIG. 2 and FIG. 3, an anti-sticking rotating device 100, which includes:

a base 111, the base 111 is provided with a mounting slot 112 and two flanges 110, and the two flanges 110 are respectively arranged on both sides of the top surface 112a of the mounting slot 112;

a runner 101, the runner 101 is in shape of a disc, the center of it is provided with a rotary shaft 114 with two ends 114a and 114b, the two ends 114a and 114b of the rotary shaft 114 are pivoted with the two flanges 110 respectively, and the runner 101 is placed in the mounting slot 112;

an extending part 107 is arranged on the circumference of the runner 101, and the extending part 107 is fixed to a head 610; the two sides of the runner 101 are respectively provided with a driving mechanism and a limiting mechanism; the driving mechanism drives the runner 101 to rotate, and the limiting mechanism limits rotating direction and rotating amplitude of the runner 101, thereby driving the head 610 to nod.

The driving mechanism has a first motor 104, the first motor 104 is fixed with a reducer 105, the shaft 105a of the reducer 105 is fixed with a gear 103, the gear 103 meshes with a rack 102, and the rack 102 is fan-shaped and arranged on one side of the runner 101.

The limiting mechanism comprises two micro switches 106 and an extending block 113; the two micro switches 106 are arranged on the other side of the runner 101 the two flanges 110 are fixed with a first retaining ring 108 and a second retaining ring 109 respectively to form two through holes 108a and 109a. The two ends 114a and 114b of the rotary shaft 114 are respectively pivoted with the two through holes 108a and 109a. The second retaining ring 109 is provided with the extending block 113 which is inserted between the two micro switches 106. The runner 101 rotates and the two micro switches 106 rotate simultaneously and touches the extending block 113 to rotate reversely.

Referring to FIG. 4, FIG. 5, FIG. 6, FIG. 7, FIG. 8 and FIG. 9, a smart pet robot with the anti-sticking rotating device 100 has a housing 600, which comprises the head 610 and the body 620. The head 610 is provided with a feeding device 200 and a camera device 500 in it. The body 620 is provided with the anti-sticking rotating device 100, a steering device 300 and a laser emitting device 400.

Figure 5:
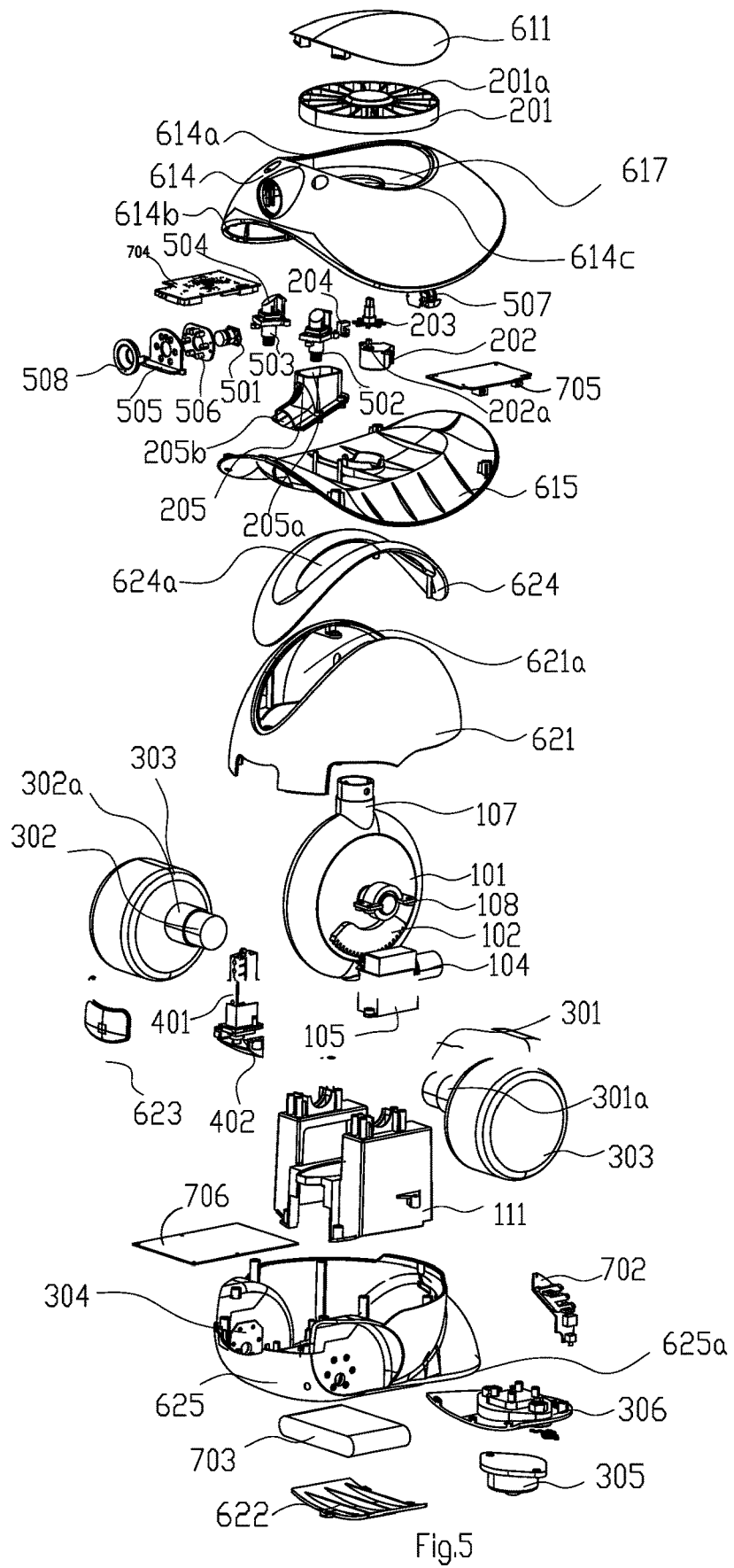
FIG. 5 is an explosion diagram of the smart pet robot of the present invention.
Figure 6:
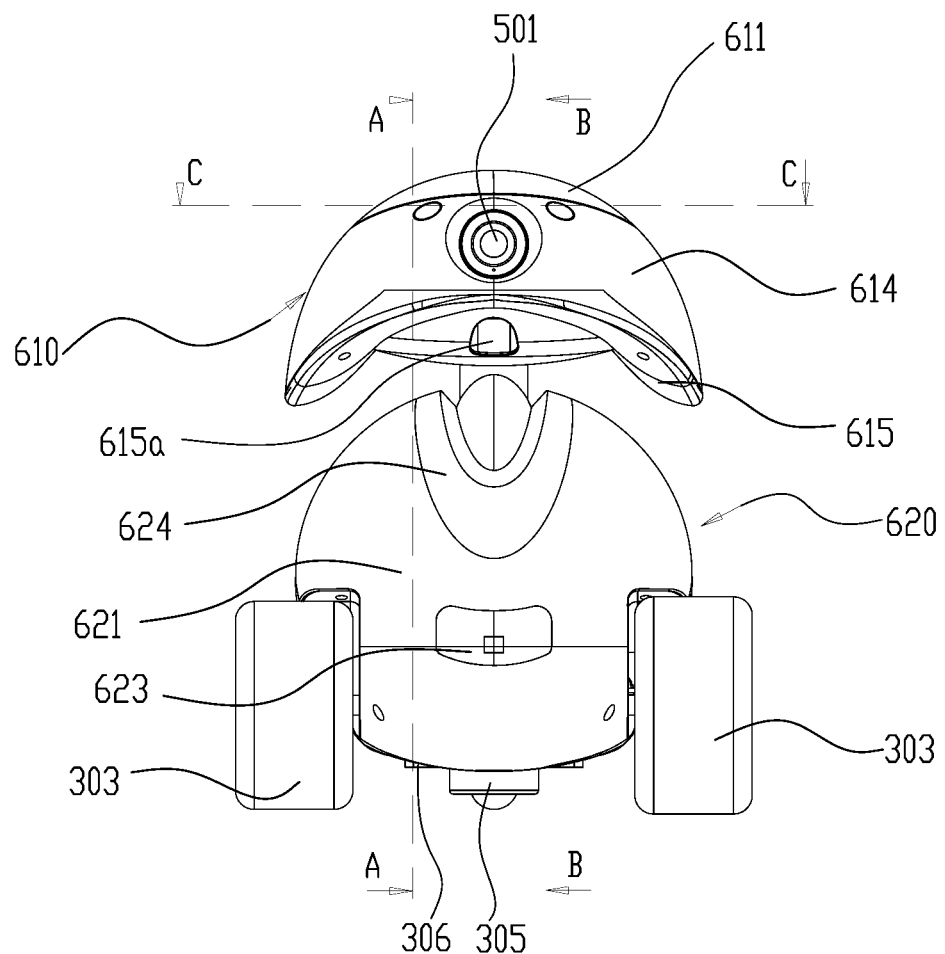
FIG. 6 is the main view of the smart pet robot of the present invention.
Figure 8:
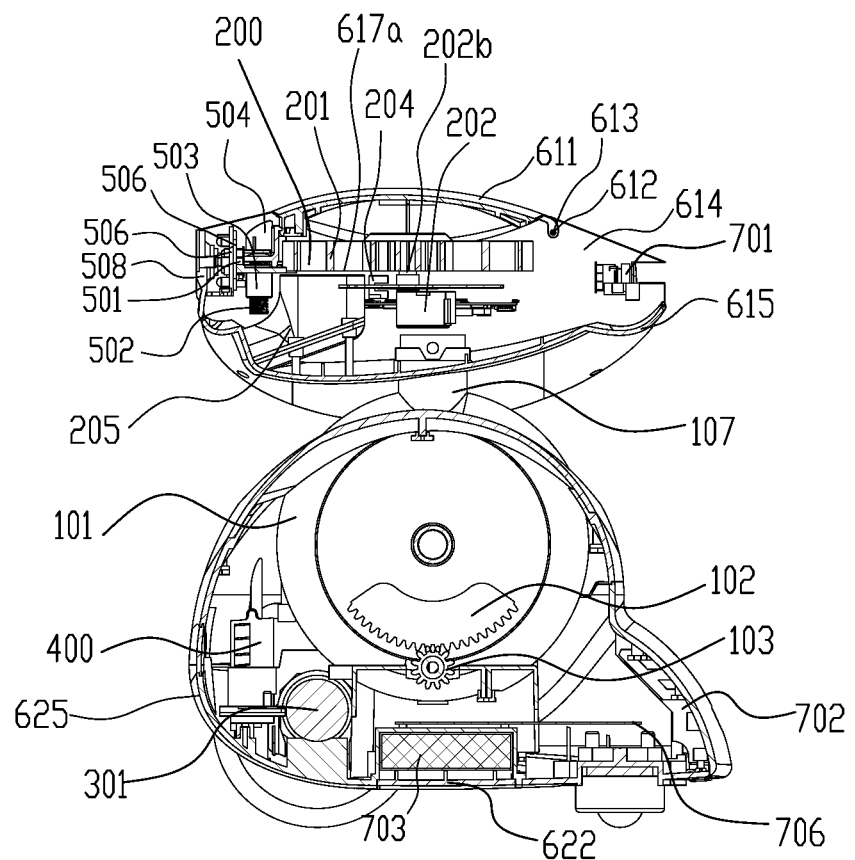
FIG. 8 is the B-B section diagram of the smart pet robot shown in FIG. 5.

Referring to FIG. 5 and FIG. 8, the head 610 includes an upper plate 614, a flip cover 611 set at the top 614a of the upper plate 614, and a lower plate 615 fixed to the bottom 614b thereof. The connection of the upper plate 614 and the flip cover 611 is threaded connection, clasp connection or pivoted connection. The present invention is not illustrated here. Preferably, the upper plate 614 and the flip cover 611 are pivoted in the embodiment. In particular, the upper plate 614 and the flip cover 611 are fixed connected by a pin 612, a torsion spring 613 pivots the pin 612, one end of the torsion spring 613 is against the flip cover 611, the other end of the torsion spring 613 is against the upper plate 614.

Figure 9:
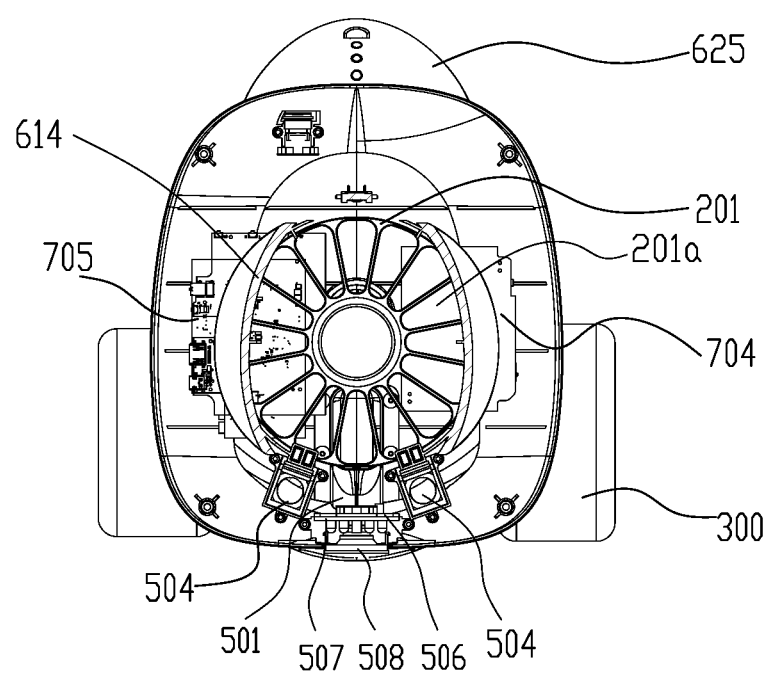
FIG. 9 is the C-C section diagram of the smart pet robot shown in FIG. 5.

Referring to FIG. 5, FIG. 8 and FIG. 9, the feeding device 200 is located below the flip cover 611 and is fixed to the upper plate 614 and the lower plate 615.

Concretely, referring to FIG. 5, FIG. 8 and FIG. 9, the top 614a of the upper plate 614 is provided with a containing groove 617, the bottom 614b of which is provided with a through hole 614c; the feeding device 200 includes a turntable 201, a second motor 202, a small gear 203, a photoelectric switch 204 and a channel 205; the turntable 201 is arranged in the containing groove 617, the turntable 201 is evenly separated into a plurality of slots 201a, and the through hole 614c is arranged below the slots 201a of the turnable 201. The flip cover 611 covers the turntable 201 on the containing groove 617; the second motor 202 is placed between the upper plate 614 and the lower plate 615; the small gear 203 is fixed to the middle of the shaft 202a of the second motor 202; the end part 202b of the shaft 202a of the second motor 202 is fixed to the turntable 201; the photoelectric switch 204 is arranged at the bottom 617a of the containing groove 617; the number of teeth of the small gear 203 corresponds to the number of slots 201a in the turntable 201, and when each tooth of the small gear 203 turns around the photoelectric switch 204, it is detected by it; the containing groove 617 connects with one end 205a of the channel 205 through the through hole 614c, the other end 205b of the channel 205 is fixed to the lower plate 615, and the lower plate 615 is provided with an opening 615a opposite to the other end 205b of the channel 205.

Figure 7:
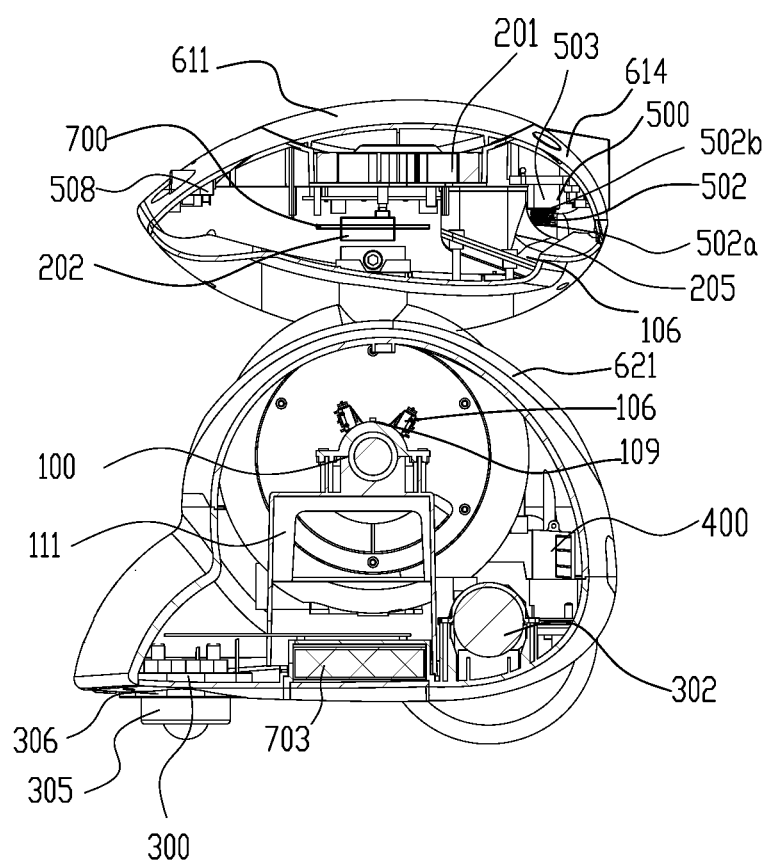
FIG. 7 is the A-A section diagram of the smart pet robot shown in FIG. 5.

Referring to FIG. 5, FIG. 7 and FIG. 9, The camera device 500 is arranged in front and back of the feeding device 200 and is fixed to the upper plate 614; the camera device 500 comprises a front camera 501, two button switches 504 and a rear camera 507; the front camera 501 is arranged in the middle of the two switch buttons 504 and is fixed to the front of the upper plate 614, and the rear camera 507 is fixed to the back of the upper plate 614.

Referring to FIG. 5, the camera device 500 also includes a spring 502, a fixed sleeve 503, a block plate 505, a night light 506 and a decorative cover 508. The switch buttons 504 are arranged within the fixed sleeve 503, which is fixed to the upper plate 614. The spring 502 is arranged in the fixed sleeve 503, one end 502a of the spring 502 is attached to the lower plate 615, and the other end 502b of the spring 502 is attached to the end of the block plate 505. The front camera 501 is arranged in middle of the two switch buttons 504, the night lamp 506 are arranged in front of the front camera 501, and the block plate 505 are arranged in front of the night light 506. The decorative cover 508 is fixed to the front of the upper plate 614 and attached to the front camera 501, the rear camera 507 is fixed to the back of the upper plate 614.

Referring to FIG. 5, the body 620 comprises an upper housing body 621, a closing plate 622, a laser transmission plate 623, an avoiding shell 624 and a lower shell body 625. The closing plate 622 is arranged in middle of the bottom of the lower shell body 625; the top of the upper shell body 621 is provided with a notch 621a, the avoiding shell 624 is mounted on the notch 621a, and the avoiding shell 624 is provided with an opening 624a for the runner101, the runner101 extends from the opening 624a and the extending part 107 is fixed with the lower plate 615 of the head 610.

Referring to FIG. 5, FIG. 6, FIG. 7 and FIG. 8, the steering device 300 is arranged on both sides of the anti-sticking rotating device 100 and is fixed to the lower shell body 625 of the body 6 20. The steering device 300 includes a third motor 301, a fourth motor 302, two wheels 303, a fixed hoop 304, a ball wheel 305 and a ball wheel mounting plate 306. The rotating shaft 301a of the third motor 301 and the rotating shaft 302a of the fourth motor 302 are respectively fixed to the two wheels 303; the center axis of the two wheels 303 are arranged parallel to that of the rotating shafts 301a and 302a. The third motor 301 and the fourth motor 302 are fixed to the lower shell body 625 through two fixed hoops 304; the rear plate 625a of the lower shell body 625 is fixed with a ball wheel mounting plate 306, the ball wheel mounting plate 306 is fixed with a ball wheel 305, and the ball wheel 305 is distributed in an isosceles triangle with the two wheels 303. When the third motor 301 rotates, the fourth motor 302 does not move to achieve a left turn. When the fourth motor 302 rotates, the third motor 301 does not move to realize the right turn. The third motor 301 and the fourth motor 302 rotate at the same time to realize the front and back straight.

The front of the upper shell body 621 is provided with the laser transmission plate 623, and the bottom middle of the lower shell body 625 is provided with the closing plate 622. The laser emitting device 400 is positioned in front of the anti-sticking rotating device 100 and located behind the laser transmission plate 623 of the boy 620. The laser emitting device 400 comprises laser pens 401 and an installation frame 402; the number of the laser pens is at least two, the laser pens 401 are fixed to the mounting frame 402, which is fixed to the lower shell body 625 of the body 620 and is located in front of the base 111.

Referring to FIG. 5, the smart pet robot 100 also has a control device 700, the control device 700 includes a charging socket 702, a battery 703, a first circuit board 704, a second circuit board 705 and a third circuit board 706. The charging socket 702 is arranged on the rear plate 625a of the lower shell body 625; the third circuit board 706 is arranged under the anti-sticking rotating device 100 and is fixed to the base 111, and the battery 703 is arranged in the base 111 and under the third circuit board 706; the first circuit board 704 and the second circuit board 705 are arranged on both sides of the first motor 104 and below the turntable 201.

The first motor 104, the second motor 202 and the photoelectric switch 204 are electrically connected to the first circuit board 704. The front camera 501, the night light 506 and the rear camera 507 are electrically connected to the second circuit board 705. The charging socket 702, the third motor 301, the fourth motor 302, the laser pen 401 and the battery electrically connected with the third circuit board 706.

Figure 10:
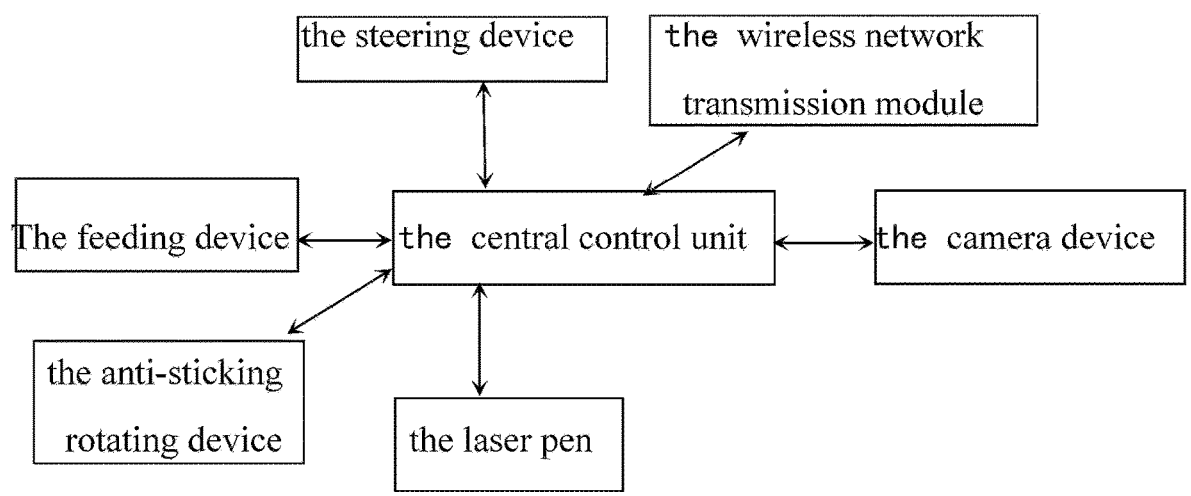
FIG. 10 is the schematic diagram of the control system of the smart pet robot.

Referring to FIG. 10, the control system of the smart pet robot includes a wireless network transmission module 801, a central control unit 802, the anti-sticking rotating device 100, the feeding device 200, the steering device 300, the laser pens 401, the camera device 500 and an APP installed on the smart phone. The wireless network transmission module 801, the feeding device 200, the steering device 300, the camera device 500 and the laser pens 401 are electrical and signal connections to the central control unit 802, respectively.

The wireless network transmission module 801 is used for receiving remote control instructions from the smart phone;

The central control unit 802 is used for sending corresponding orders to control the anti-sticking rotating device 100, the feeding device 200, the steering device 300, the laser pen 401 and the camera device 500 according to the remote control instructions received by the wireless network transmission module 801.

The feeding device 200 is used for throwing food to a pet according to the corresponding order sent by the central control unit 802.

The anti-sticking rotating device 100 rotates to shake the stuck food and drop it down according to the corresponding instructions sent by the central control unit 802.

The steering device 300 is used for moving the smart pet robot in according to the corresponding instructions sent by the central control unit 802 and throw the food in front of the pet.

The laser pen 401 is used for firing a laser to attract the attention and interest of a pet according to a corresponding instructions sent by the central control unit 802 so that the pet can run with the laser.

The camera device 500 is used for real-time shooting the video of the pet running along with the smart pet robot in motion, according to the corresponding instructions sent by the central control unit 802, and transmitting the video to the smart phone.

The above content is a further detailed explanation of the present invention in combination with the specific optimal implementation mode, and it cannot be assumed that the concrete implementation of the present invention is limited to these instructions only. For the common technical personnel in the technical field of the present invention, the structure form of the present invention can be flexible and changeable, and a series of products can be derived without departing from the concept of the present invention. A number of simple deductions or replacements shall be deemed to fall within the scope of patent protection determined by the submitted claims.

What is claimed is:

1. An anti-sticking rotating device, arranged below a head, wherein comprising:
    a base, said base is provided with a mounting slot and two flanges, and said two flanges are arranged on both sides of a top surface of said mounting slot respectively;
    a runner, said runner is in shape of a disc, a center of said runner is provided with a rotary shaft with two ends, said two ends of said rotary shaft are pivoted with said two flanges respectively, and said runner is placed in said mounting slot;
    an extending part is arranged on circumference of said runner, and said extending part is fixed to said head; two sides of said runner are respectively provided with a driving mechanism and a limiting mechanism; said driving mechanism drives said runner to rotate, and said limiting mechanism limits rotating direction and rotating amplitude of said runner, thereby driving said head to move like nodding;
    wherein said driving mechanism has a first motor, said first motor is fixed with a reducer with shaft, said shaft of said reducer is fixed with a gear, said gear meshes with a rack, and said rack is fan-shaped and arranged on one side of said runner;
    wherein said limiting mechanism comprises two micro switches and an extending block; said two micro switches are arranged on the other side of said runner; said two flanges are fixed with a first retaining ring and a second retaining ring respectively to form two through holes; said two ends of said rotary shaft are respectively pivoted with said two through holes; said second retaining ring is provided with said extending block which is inserted between said two micro switches; said runner rotates and said two micro switches rotate simultaneously and touches said extending block to rotate reversely.

2. A smart pet robot with an anti-sticking rotating device, wherein said smart pet robot has a housing, which comprises a head and a body; said head is provided with a feeding device and a camera device in it; said body is provided with said anti-sticking rotating device, a steering device and a laser emitting device;
    said anti-sticking rotating device, arranged below said head, comprising:
    a base, said base is provided with a mounting slot and two flanges, and said two flanges are arranged on both sides of a top surface of said mounting slot respectively;
    a runner, said runner is in shape of a disc, a center of said runner is provided with a rotary shaft with two ends, said two ends of said rotary shaft are pivoted with said two flanges respectively, and said runner is placed in said mounting slot;
    an extending part is arranged on the circumference of said runner, and said extending part is fixed to said head; two sides of said runner are respectively provided with a driving mechanism and a limiting mechanism; said driving mechanism drives said runner to rotate, and said limiting mechanism limits rotating direction and rotating amplitude of said runner, thereby driving said head to move like nodding;
    wherein said driving mechanism has a first motor, said first motor is fixed with a reducer, the shaft of said reducer is fixed with a gear, said gear meshes with a rack, and said rack is fan-shaped and arranged on said one side of said runner;
    wherein said limiting mechanism comprises two micro switches and an extending block; said two micro switches are arranged on said other side of said runner; two of said flange are fixed with a first retaining ring and a second retaining ring respectively to form two through holes; said two ends of said rotary shaft are respectively pivoted with said two through holes; said second retaining ring is provided with said extending block which is inserted between said two micro switches; said runner rotates and said two micro switches rotate simultaneously and touches said extending block to rotate reversely.

3. The smart pet robot with said anti-sticking rotating device according to claim 2, wherein said head includes an upper plate with top and bottom, a flip cover set at said top of said upper plate, and a lower plate fixed to said bottom of said upper plate; said top of said upper plate is provided with a containing groove, said bottom of said upper plate is provided with a through hole; said feeding device includes a turntable, a second motor with a shaft, a small gear, a photoelectric switch and a channel; said turntable is arranged in said containing groove, said turntable is evenly separated into a plurality of slots, and said through hole is arranged below said slots; said flip cover covers said turntable on said containing groove; said second motor is placed between said upper plate and said lower plate; said small gear is fixed to middle of said shaft of said second motor; an end part of said shaft of said second motor is fixed to said turntable; said photoelectric switch is arranged at bottom of said containing groove; the number of teeth of said small gear corresponds to the number of slots in said turntable, and when each tooth of said small gear turns around said photoelectric switch, it is detected by said photoelectric switch; said containing groove connects with one end of said channel through said through hole, the other end of said channel is fixed to said lower plate, and said lower plate is provided with an opening opposite to the other end of said channel.

4. The smart pet robot with said anti-sticking rotating device according to claim 2, wherein said camera device is arranged in front and back of said feeding device and is fixed to said upper plate; said camera device comprises a front camera, two button switches and a rear camera; said front camera is arranged in middle of said two switch buttons and is fixed to front of said upper plate, and said rear camera is fixed to back of said upper plate.

5. The smart pet robot with said anti-sticking rotating device according to claim 3, wherein said body comprises an upper housing body, a closing plate, a laser transmission plate, an avoiding shell and a lower shell body; said closing plate is arranged in middle of bottom of said lower shell body; top of said upper shell body is provided with a notch, said avoiding shell is mounted on said notch, and said avoiding shell is provided with a opening for said runner, said runner extends from said opening and said extending part is fixed with said lower plate of said head.

6. The smart pet robot with said anti-sticking rotating device according to 5, wherein said steering device includes a third motor having shaft and a fourth motor having shaft, and two wheels; said rotating shaft of said third motor and said rotating shaft of said fourth motor are respectively fixed to one of said two wheels; said steering device is arranged on both sides of said anti-sticking rotating device and is fixed to said lower shell body of said body, and center shafts of said two wheels is arranged parallel to said rotary shaft; said third motor and said fourth motor are fixed to said lower housing body through two fixed hoops; of said lower shell body has a rear plate which is fixed with a ball wheel mounting plate, said ball wheel mounting plate is fixed with a ball wheel, and said ball wheel is distributed in an isosceles triangle with said two wheels.

7. The smart pet robot with said anti-sticking rotating device according to claim 5, wherein said laser emitting device is positioned in front of said anti-sticking rotating device and located behind said laser transmission plate of said body; said laser emitter is provided with laser pens and an installation frame; the number of said laser pens is at least two, said laser pens are fixed to said mounting frame, which is fixed to said lower shell body of said body and is located in front of said base.

8. The smart pet robot with said anti-sticking rotating device according to claim 6, wherein said smart pet robot also has a control device, said control device includes a charging socket, a battery, a first circuit board, a second circuit board and a third circuit board; said charging socket is arranged on said rear plate of said lower shell body; said third circuit board is arranged under said anti-sticking rotating device and is fixed to said base, and said battery is arranged in said base and under said third circuit board; said first circuit board and said second circuit board are arranged on both sides of said first motor and below said turntable.

* * * * *